United States Patent

[11] 3,593,711

| [72] | Inventors | Charles H. Staub, Jr.<br>Pittsburgh;<br>Miles J. McGoff, Warrendale, both of, Pa. |
|---|---|---|
| [21] | Appl. No. | 803,172 |
| [22] | Filed | Feb. 28, 1969 |
| [45] | Patented | July 20, 1971 |
| [73] | Assignee | Mine Safety Appliances Company<br>Pittsburgh, Pa. |

[54] DUAL CANISTER CHEMICAL-TYPE LIFE SUPPORT SYSTEM
7 Claims, 4 Drawing Figs.

[52] U.S. Cl. ..................................... 128/191, 98/1.5
[51] Int. Cl. ....................................... A61l 9/10
[50] Field of Search........................... 128/191, 145, 142.5, 1 B, 142.2, 142.6, 142.3, 142.7, 202, 204; 98/1.5; 23/281; 62/68

[56] References Cited
UNITED STATES PATENTS

| 2,299,109 | 10/1942 | Rand | 128/191 |
| 3,088,810 | 5/1963 | Hay | 128/191 (X) |
| 3,148,034 | 9/1964 | Bovard et al. | 23/281 |
| 3,410,191 | 11/1968 | Jackson | 98/1.5 |
| 3,500,827 | 3/1970 | Paine | 128/142.5 |

Primary Examiner—Richard A. Gaudet
Assistant Examiner—G. F. Dunne
Attorney—Brown, Murray, Flick & Peckham ABSTRACT: In a sealed chamber or room there are means for circulating vitiated air, which is low in oxygen, through a first body of carbon dioxide absorbing and oxygen producing chemical to remove excess carbon dioxide and to add oxygen. When the oxygen concentration in the air in the chamber reaches a predetermined maximum, means responsive to the oxygen concentration stops delivery of the air to the chemical body and circulates it instead through a second chemical body that absorbs carbon dioxide until the consumption of oxygen from the air causes the oxygen concentration to fall to a predetermined minimum. Then the airflow is switched back to the first chemical body to replenish the oxygen. Consequently, excess carbon dioxide is removed from the air continuously and oxygen is added to the air periodically as needed.

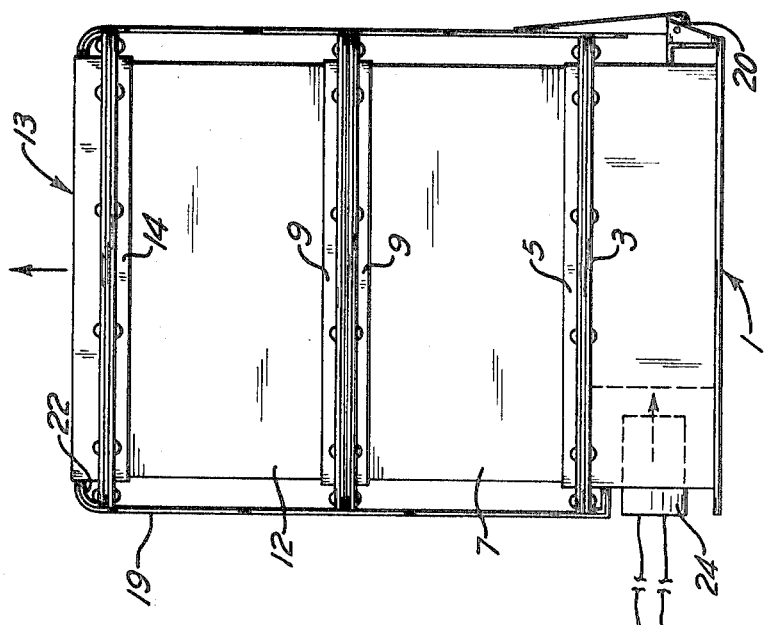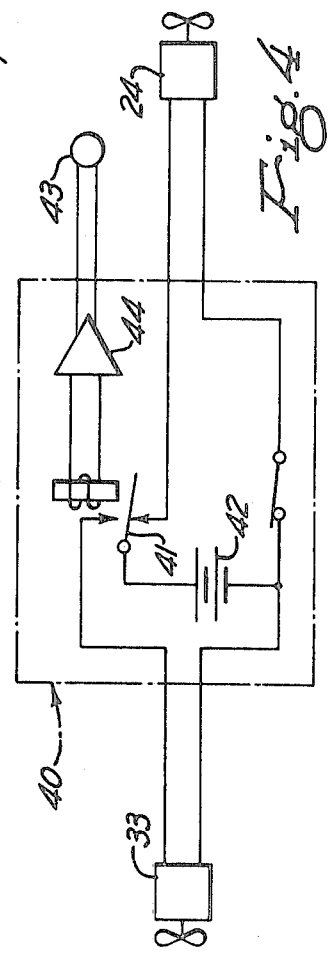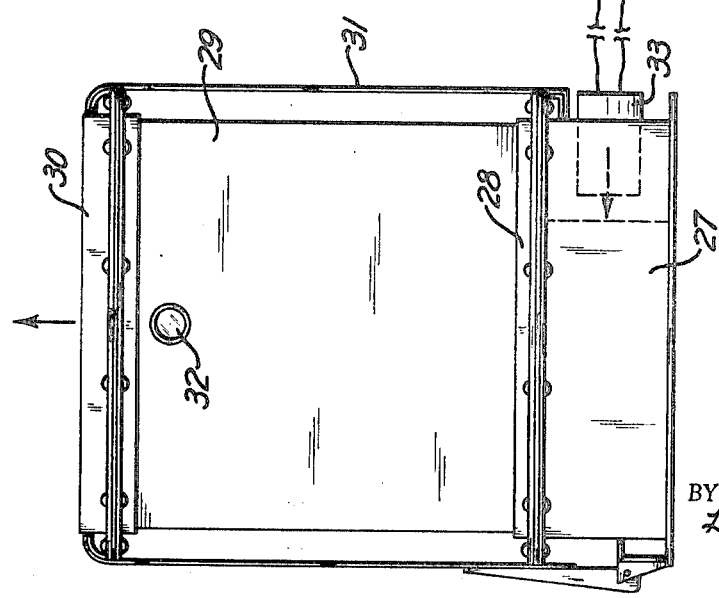

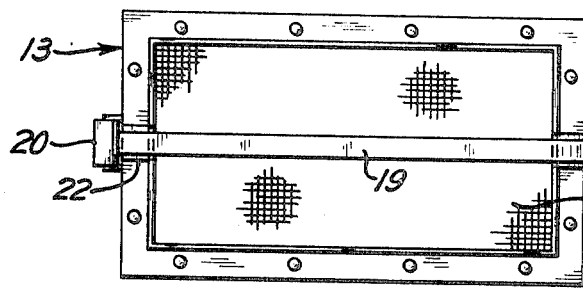
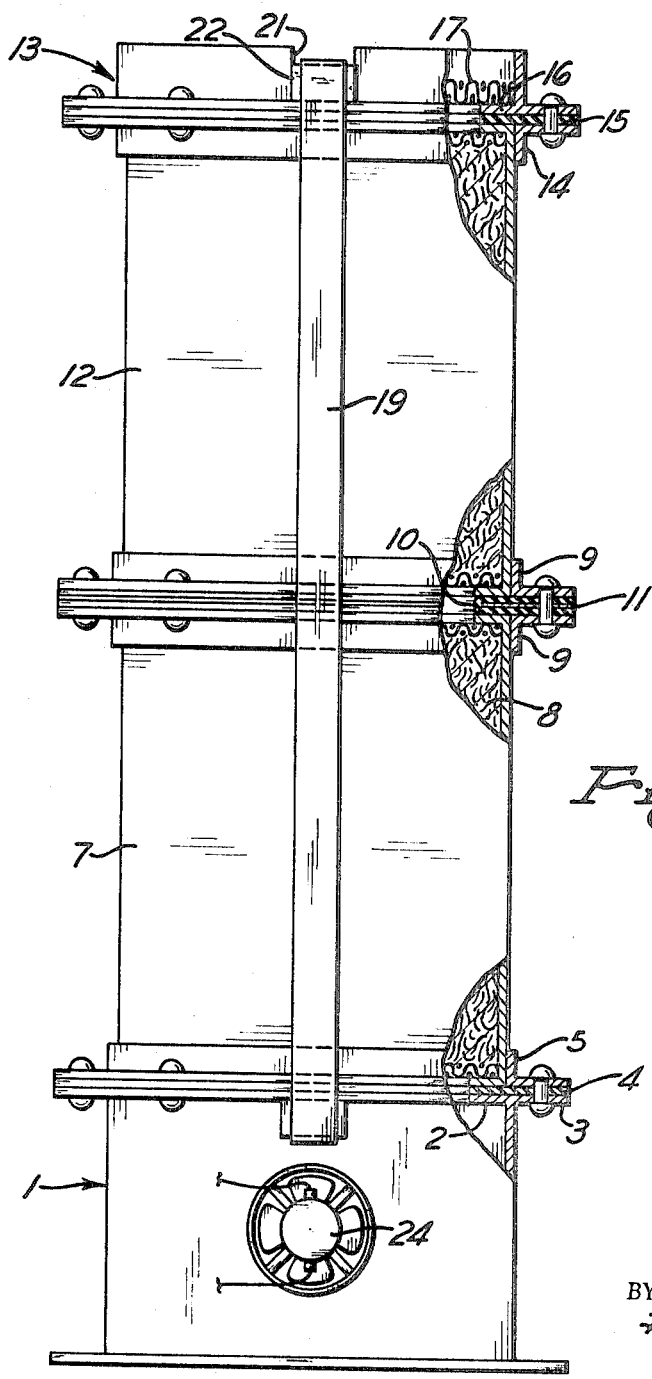

DUAL CANISTER CHEMICAL-TYPE LIFE SUPPORT SYSTEM

The invention herein described was made in the course of or under a contract or subcontract thereunder with the Department of the Navy.

In a sealed chamber where people are living and working it is necessary to purify the exhaled air and to add oxygen to it in order to maintain the oxygen concentration in the air at an acceptable level. This can be done by circulating the air in the chamber through a chemical that will remove excess carbon dioxide and supply oxygen. However, such a chemical tends to generate oxygen faster than it is needed, so that some of the chemical is wasted and the supply is exhausted sooner than it should be. It is only necessary to add oxygen to the air when the oxygen concentration starts to fall below a certain point, but since carbon dioxide should be removed continually it does not do to stop the circulation of air through the chemical periodically.

It is among the objects of this invention to provide life-sustaining apparatus with which a desired oxygen level in the air can be maintained, with which carbon dioxide can be removed continuously, and in which the oxygen-producing chemical is not wasted.

The preferred embodiment of the invention is illustrated in the accompanying drawings, in which FIG. 1 is a side view of the apparatus;

FIG. 2 is a plan view of one of the canisters;

FIG. 3 is an end view of the oxygen-producing canisters, with parts broken away in sections; and FIG. 4 is a diagram illustrating an electric circuit.

Referring to FIG. 3 of the drawings, a rectangular base housing 1 has an open top surrounded by an inwardly projecting flange 2 as well as an outwardly projecting flange 3. Seated on these flanges is a gasket 4 which is held in place by an upstanding flange 5 riveted through the outer portion of the gasket to the outer flange of the housing.

Above the housing there is a rectangular canister 7, with inturned ends, containing a body of carbon dioxide absorbing and oxygen generating chemical 8. Preferably, this is potassium superoxide. It may be in granular form or in the form of compact discs with passages through and around them. The lower end of the canister seats on the gasket inside flange 5, in which the canister fits snugly. Although a single canister can be used, it is preferred to employ at least two identical canisters, one above the other. For this purpose a rectangular frame is mounted on top of the lower canister. The frame is formed from two superimposed angles 9, the horizontal flanges of which clamp between them a gasket 10 that is folded around a thin metal plate 11 projecting inwardly from the angles. The downwardly extending flange of the frame fits around the upper end of the lower canister, with the gasket seated on top of that canister. The upwardly extending flange of the frame surrounds the lower end of the upper canister 12, which rests on the gasket.

Seated on the upper end of the upper canister is a top frame 13, which has a depending flange 14 surrounding the upper end of the canister. A gasket 15 extends inwardly over the top of that canister and spaces it from an inwardly projecting flange 16 of the frame. The outer part of the gasket is clamped between horizontal portions of the frame. The frame also extends upwardly above the canisters and preferably contains a filter 17.

In order to clamp everything mentioned so far together to form a solid unit that will not leak, a strap 19 is secured to one end of the base housing and extends upwardly and across the top frame and then down to a releaseable clamp 20 of known construction pivoted to the opposite end of the housing. When the clamp is closed, the strap is tightened to pull the top frame down and thereby force the canisters against the three gaskets tightly. The ends of the top frame may be provided with notches 21 for receiving the strap, and with downwardly curved strips 22 over which the straps extend.

Mounted in one end of the base housing, there is an electric blower 24 for drawing air into the housing and forcing it up through the chemical in the canisters. The chemical will remove carbon dioxide and generate oxygen which will be added to the air leaving the top of the unit.

A second unit, similar to the one just described, is also provided, as shown in FIG. 1. The base housing 27 of this unit may be identical to the other one, and the vertical flange 28 on top of the housing likewise is the same. A canister 29 is supported by the base housing, and a top frame 30 like the one first described is mounted on the upper end of the canister. This frame is held down by a binding strap 31 connected at its end to the base housing and passing across the top of the frame. The canister is formed like the other canisters, except that it is taller and contains a body of carbon dioxide absorbing chemical only, which could be lithium hydroxide, baralyme, soda lime, etc. The upper part of the sidewall of this canister has a small window 32 in it so that the color of the chemical can be observed. When the chemical changes color it will be known that it is exhausted and the canister should be replaced. An electric blower 33 is mounted in one end of the housing for blowing air up through it.

The two blowers are electrically connected to a control unit 40 of conventional construction, in or connected with which there is a sensor, such as a polarographic cell, for sensing the oxygen concentration in the chamber and causing an electric switch to operate accordingly to energize the blowers alternately. The control unit includes an amplifier for amplifying the sensor signal, and a relay. The electric circuit is such that the blower 24 in base housing 1 will normally operate, but when the oxygen concentration in the air reaches a predetermined maximum, the sensor causes the circuit switch to shut off that blower and to start the other blower 33. When the consumption of oxygen from the air causes the oxygen concentration to fall to a certain level, the sensor allows the switch to return to its original position, thereby shutting off the second blower and starting the first blower again.

This action can be illustrated by the diagram in FIG. 4. The normally closed relay switch 41 connects battery 42 with blower 24 when the oxygen concentration falls to 20 percent, and the blower circulates vitiated air through canisters 7 and 12 to absorb carbon dioxide and add oxygen until the oxygen concentration reaches 22 percent. At that point, the control unit 40 responds to the signal from the sensor 43 and, through an amplifier 44, actuates the relay so that switch 41 is shifted to open the circuit to blower 24 and to close the circuit to blower 33. The air in the chamber then is circulated through canister 29 only, and the carbon dioxide is absorbed. During this period the chemical in the other unit is not being used, so overproduction of oxygen is avoided. Since oxygen is not now being added to the air, the oxygen concentration will gradually decrease until it reaches 20 percent again. Then the sensor will allow the switch to shift back to its original position so that once again air will flow through canisters 7 and 12 to add oxygen as well as absorb carbon dioxide. In this way, carbon dioxide is absorbed continuously, but oxygen is added to the air only when needed.

When the oxygen concentration level can no longer be sustained, canister 7 is removed and canister 12 is moved into its place. A fresh canister takes the downstream position formerly occupied by canister 12. In this way each successive upper canister can be fully utilized by moving it to the lower position where it can supplement oxygen production and continue to absorb carbon dioxide for a time. Of course, if desired, only a single canister can be used. The control unit 40 can be provided with an alarm that is actuated when the sensor responds to an oxygen concentration that has fallen to 19.5 percent, for example, thereby signalling that a canister needs replacing.

We claim:

1. Apparatus for supporting life in a sealed chamber, comprising a first body of carbon dioxide absorbing and oxygen-producing chemical, a second body of carbon dioxide absorbing chemical, first means for circulating vitiated air low in oxygen from said chamber through said first body to remove excess carbon dioxide and add oxygen, and second means for circulating air from said chamber through said second body to remove carbon dioxide and means responsive to the oxygen concentration in the air in said chamber for stopping circulation of air through said first body when said oxygen concentration reaches a predetermined maximum and for actuating said second circulating means for circulating the air through said second body until consumption of oxygen from the air causes said oxygen concentration to fall to a predetermined minimum, whereby excess carbon dioxide is removed from the air continuously and oxygen is added to the air periodically as needed.

2. Apparatus according to claim 1, in which said circulating means are electric blowers, and said oxygen-responsive means include electrical means for switching back and forth from one blower to the other.

3. Apparatus according to claim 1, including a pair of base housings having open tops and inlets below the tops, a canister containing said first chemical body, a canister containing said second chemical body, said canisters having open tops and bottoms, each canister resting on one of said housings, and removable means for holding each canister in sealing relation with the housing below it.

4. Apparatus according to claim 3, in which each of said removable means includes a strap anchored at one end to a housing and extending up and over the canister thereon, and releasable clamping means detachably connecting the other end of the strap to the housing to hold the strap taut.

5. Apparatus according to claim 3, including a third canister open at top and bottom and filled with a carbon dioxide absorbing and oxygen-producing chemical, a frame seated on top of the other canister that contains said first chemical body and having a depending flange surrounding and engaging that canister, said frame also having an upstanding flange, and the lower end of said third canister being surrounded and engaged by said upstanding flange.

6. Apparatus according to claim 5, including a frame containing a filter and mounted on top of said third canister, said removable means holding said last-mentioned frame down on top of said third canister.

7. Apparatus according to claim 5, in which said frame is provided with a gasket secured thereto and projecting inwardly between the adjoining ends of said third canister and said other canister.